United States Patent
Den Besten et al.

(10) Patent No.: US 6,498,541 B2
(45) Date of Patent: Dec. 24, 2002

(54) COMMUNICATION BUS SYSTEM AND APPARATUS AND DEVICE FOR USE IN SUCH A SYSTEM

(75) Inventors: Gerrit Willem Den Besten, Eindhoven (NL); Marcus Egbert Kole, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/884,222

(22) Filed: Jun. 19, 2001

(65) Prior Publication Data

US 2002/0014930 A1 Feb. 7, 2002

(30) Foreign Application Priority Data

Jun. 20, 2000 (EP) .............................................. 00202147

(51) Int. Cl.[7] ................................................. H03H 7/48
(52) U.S. Cl. ........................ 333/125; 333/136; 327/293
(58) Field of Search ................................. 333/125, 136, 333/101, 124, 100; 327/293; 370/200; 375/257, 200; 455/502

(56) References Cited

U.S. PATENT DOCUMENTS 4,509,073 A  *  4/1985  Baran et al. ................. 725/119
5,566,171 A  *  10/1996  Levinson ...................... 370/352
5,799,041 A  *  8/1998  Szkopek et al. ............. 375/259

OTHER PUBLICATIONS

Patent Abstracts Of Japan, Ishii Chiharu, "Connection Detector," Publication No. 58082324, May 17, 1983, Application No. 56179826, Nov. 11, 1981.
Patent Abstracts Of Japan, Hatsuda Tsuguo, "Detecting System For Cable Unconnected State," Publication No. 59191943, Oct. 31, 1984, Application No. 58065398, Apr. 15, 1983.

* cited by examiner

*Primary Examiner*—Robert Pascal
*Assistant Examiner*—Dean Takaoka

(57) ABSTRACT

A station in a communication bus system is connected to a signal transmission line. The station contains a wave splitter coupled to the transmission line and a transmission section coupled to an input of the wave splitter for transmitting an outgoing wave signal to travel out over the transmission line from the wave splitter. The station contains a reception section coupled to an output of the wave splitter for receiving an incoming wave signal that travels into the wave splitter from the connector. The station has a control unit being arranged to operate in different control modes, according to the presence or absence of a further apparatus connected to the transmission line, dependent on whether the reception section does not detect or does detect a reflection of a wave transmitted by the transmission section, respectively.

4 Claims, 2 Drawing Sheets

COMMUNICATION BUS SYSTEM AND APPARATUS AND DEVICE FOR USE IN SUCH A SYSTEM

FIELD OF TECHNOLOGY

Figure 1:
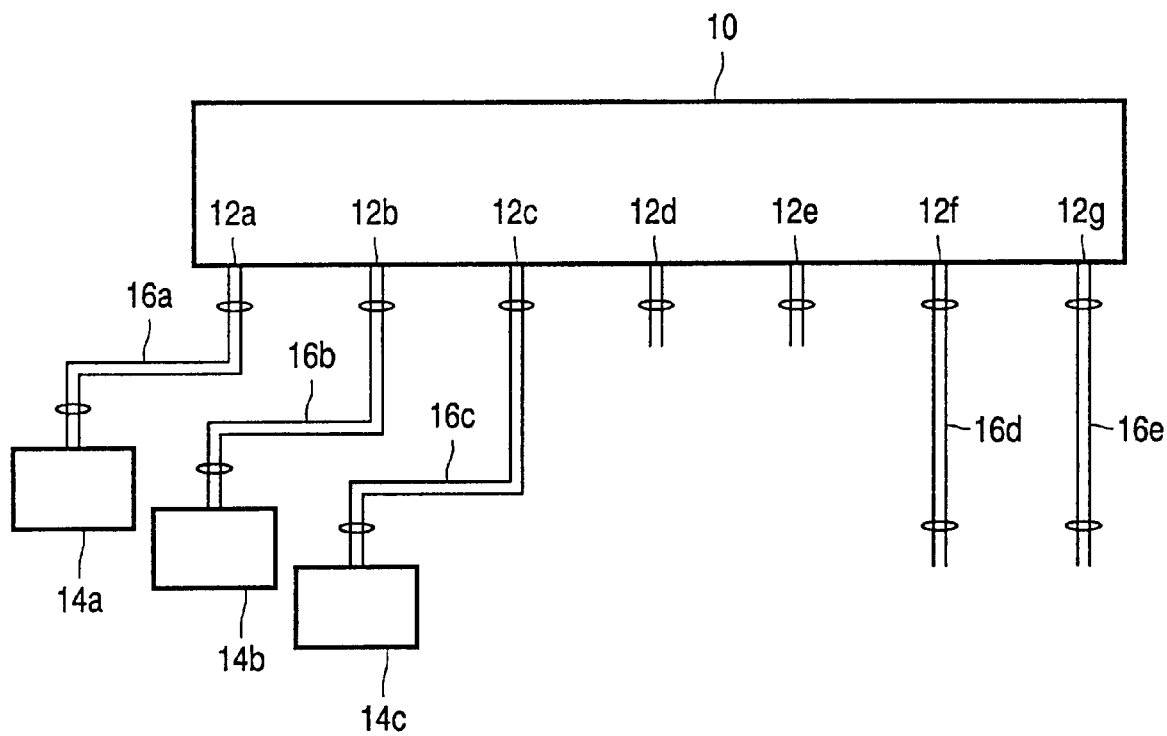

The invention relates to a communication bus system in which a plurality of stations is connected by signal transmission lines to enable communication between the stations using a bus like the USB bus.

BACKGROUND AND SUMMARY

A USB system has connectors, which the user may use to connect and disconnect stations at will, even when the system is running. The system detects whether a station has been connected to a connector and, if so, it logically incorporates the connected station into the system, so that communication with the station becomes possible. The system also detects when a station has been disconnected and; if so, logically disincorporates the station from the system, so that no more communication with the station is performed or expected. This automatic incorporation and disincorporation is an important feature to make the system easy to use for non-specialist consumers.

In a USB system one station, for example a personal computer, is at the root of the bus structure. This station is the bus master. This station has one or more connectors, which can be used to connect the root to "downstream" stations, each via its own cable connected to a connector. In the USB system the downstream stations in turn may have connectors that may be used to connect them to further downstream stations and so on in a tree structure. The interconnected stations, which are thus directly or indirectly coupled to the root, together form the bus system.

It is not necessary that all connectors are permanently connected to downstream stations. The user of the system may connect or disconnect a downstream station or leave the connector unused as desired. The system detects whether or not a downstream station is connected to or disconnected from the connector and operates accordingly: no messages commands etc. are transmitted via connectors to which no downstream station is connected. In the USB system detection of the presence of a station is performed by means of current drawn through resistors. Each downstream station contains a resistor connected to the cable that connects the downstream station to the connector via which it is connected to the bus system. When a downstream station is connected to the bus, its resistor draws current via the cable. This current causes a change in the voltage on the cable and this change is detected by another "upstream" station to whose connector the downstream station is connected.

Normally, detection of disconnection takes a period of "silence" in the communication on the bus. In the case of the USB bus, a time-slot is reserved for this purpose, during which no transmission is possible. This may cause a delay in disconnection and reduced transmission capacity. Furthermore it is desirable to reduce the voltage swing on the cables, both for reasons of increasing the speed and for reducing the power consumption of the bus system. However, a reduction of the voltage swing makes the detection of the voltage change due to connection of a station harder to detect.

Amongst others, it is an object of the invention to reduce the time that the bus needs to reserve to detect connection and/or disconnection.

An apparatus according to the invention is set forth in claim 1. According to the invention wave reflection is used to detect the presence or absence of stations coupled to the bus system. The time dependent voltages and currents in an electrical transmission line for example can be described by two vectors, each representing the phase and amplitude of a respective one of two traveling waves that travel through the transmission line in mutually opposite directions. At an end of the transmission line, where an impedance is connected to the transmission line, the ratio between the two wave vectors is equal to the reflection coefficient associated with the impedance. The reflection coefficient is zero when the impedance is equal to the transmission line impedance of the transmission line. As a result there will be a wave traveling in only one direction when an impedance equal to the characteristic impedance of the transmission line is connected to the transmission line.

According to the invention this effect is used to control the incorporation and especially disincorporation of downstream stations into and from the system. Stations are designed to apply the characteristic impedance of the transmission line to the transmission line. An upstream station in the system located at the other end of the transmission line transmits a wave signal via the transmission line and spits off the returning wave (if any) from the transmitted wave. If during transmission the amplitude of the returning wave is not substantially zero or substantially increases from zero, it is concluded that the transmission line is no longer terminated and therefore that a downstream station is disconnected from the transmission line. Thereupon the upstream station takes the appropriate actions to remove the downstream station logically from the system. Similarly, to enter a station logically into the system, if the amplitude of the returning wave is substantially zero, it is concluded that the transmission line is terminated and therefore that a downstream station is connected to the transmission line. Thereupon the upstream station takes the appropriate actions to incorporate the downstream station into the system.

BRIEF DESCRIPTION OF THE DRAWING FIGURES

Figure 2:
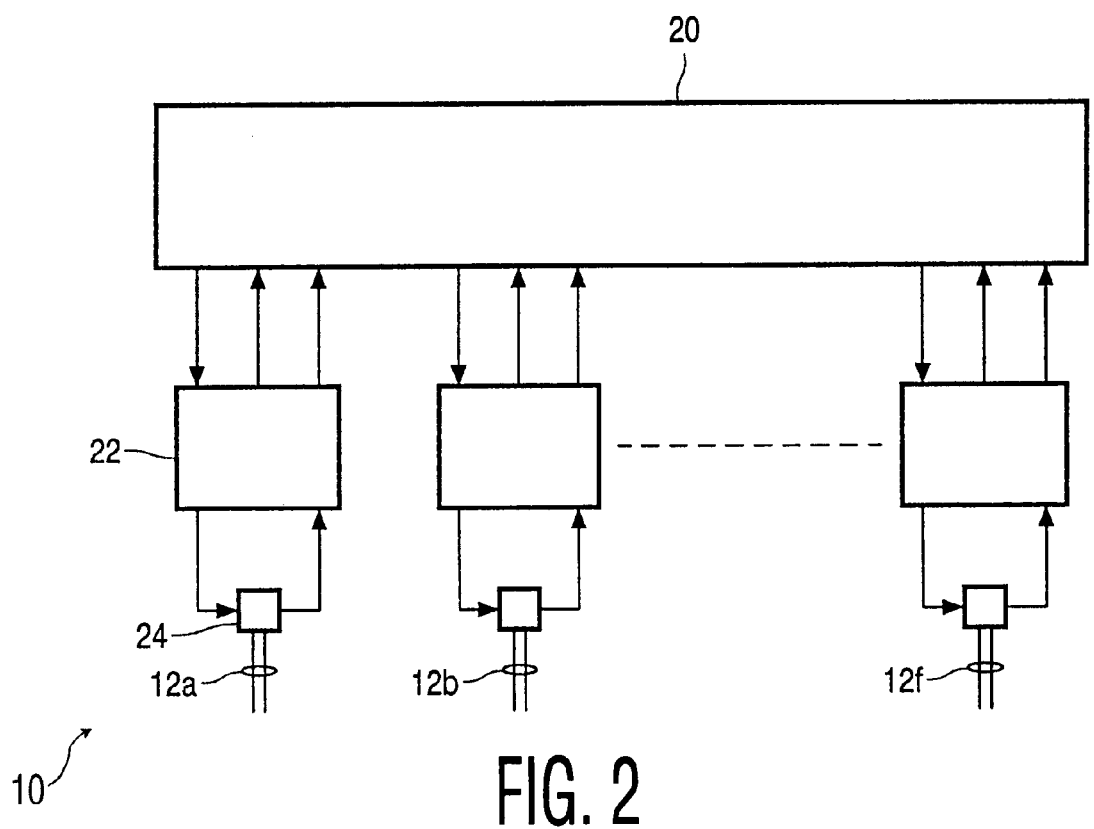
Figure 3:
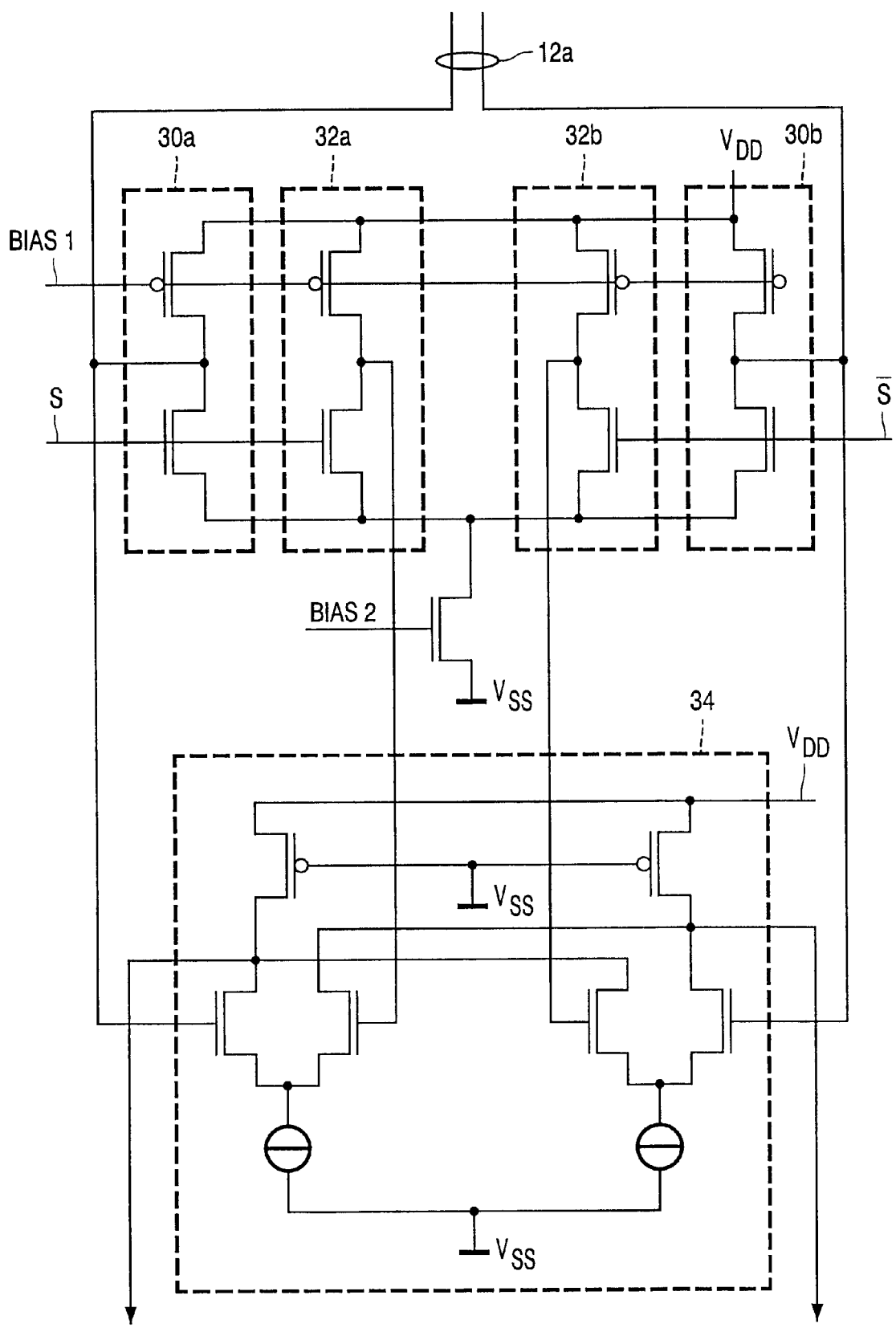

These and other advantageous aspects of the system, apparatus, device and method according to the invention will be described in more detail using the following figures, of which FIG. 1 shows a topology of a bus communication system FIG. 2 shows a station for use in a bus communication system FIG. 3 shows an example of a wave splitter.

DETAILED DESCRIPTION

FIG. 1 shows a topology of a bus communication system. The topology contains a master station 10. The master station 10 has a number of connectors 12a–g. A number of slave stations 14a–c is connected to the connectors 12a–e via respective cables 16a–c. A number of connectors 12d,e is not connected to anything, other connectors 12f,g are connected to cables 16d,e, which, however, are not connected to any stations. A standard definition for the communication bus system prescribes the type of cable 16a–e and the characteristic impedance of the cable 16a–e that should be used, for example a symmetric cable with characteristic impedance 300 Ohm. The slave stations 14a–c contain termination impedances (not shown) that form terminations of the cables 16a–c, each by its characteristic impedance.

Preferably, in case of slave stations 14a–c that need their own power supply independent of their connection to the bus system, or slave stations that are able to choose whether or not to operate as a slave station in the bus system, the termination impedances are dynamical impedances, which take their operational value only when power is supplied to the slave station 14a–c, another impedance (like an open circuit) being applied to the cable 16a–c when the slave station 14a–c is not powered up or not prepared to operate as a slave station in the bus system.

FIG. 1 shows a "flat" topology, with only one master station 10 and a number of slave stations 14a–c, but the invention applies equally well to more hierarchical topologies, in which the master station 10 in turn functions as a slave station of a higher part of the topology (not shown).

FIG. 2 shows a station 10 for use as master station in a bus system. The station 10 contains a processor 20, a connector control circuit 22 and a wave splitter 24 for one of the connectors 12a. The processor 10 is coupled to the connector control circuit 22 with an interface for sending information, for receiving information and for receiving a detection of connection or disconnection of a slave station to the connector 12a. The connector control circuit 22 has an output coupled to an input of wave splitter 24 and an input connected to an output of wave splitter 24. Wave splitter 24 has a transmission line output coupled to the connector 12a. The master station 10 may contain further connector control circuits and further wave splitters connected between the processor 10 and respective ones of the other connectors 12b–g.

In operation, processor 20 keeps a record indicating which of the connectors 12a–g are connected to slave stations 14a–c. The slave stations 14a–c may be for example printers, cameras, storage devices or display devices etc. The processor 20 functions, amongst others, as a control unit for the bus. When a program running in the processor 20 needs a slave station 14a–c with a specific function, processor 20 checks whether such a station is connected and to which connector 12a–g it is connected. Thereupon commands and/or data may be transmitted between the master station 20 and the slave station 14a–c involved. Information that represents whether a station is connected may be kept for example in records in a status table in a memory (not shown) of the station, so that the processor 20 can consult the memory to determine whether or not a required station is connected.

When a connection is made between slave station 14a–c and one of the connectors 12a–c, this is detected by the connector control circuit 22 and signaled to the processor 20. In response, an initialization protocol is executed, wherein the processor 20 queries for example what type of function is available from the connected slave station 14a–c, assigns a station identification to the slave station 14a–c, initializes the slave station 14a–c and updates the record in the processor 20 to indicate the presence of the slave station 14a–c of a particular type with an assigned identification at the specific connector 12a–g. The initialization protocol may follow for example the corresponding steps of incorporating a station in a USB bus system.

When connector control circuit 22 detects from the reflected wave that a slave station 14a–c is disconnected from one of the connectors 12a–g or one of the cables 16a–e connected to these connectors 12a–g, the connector control circuit 22 also signals this to the processor 20. In response, the processor 20 removes the slave station 14a–c from its record and terminates or throws exceptions to any processes that use the slave station 14a–c.

The connector control circuit 22 transmits signals to the connector 12a via wave splitter 24 and detects connection and disconnection by comparing the amplitudes of wave signals transmitted and received by the wave splitter 24 to and from the connector 12a. Thus, connector control circuit operates both as receiving and transmitting section for the connector 12a,b. On a cable with characteristic impedance R, for example, the voltage "V(x)" and current "I(x)" as a function of position "x" along the cable can be described by two wave vectors, A1, A2:

$$I(x)=(A1\ \exp(ikx)-A2\ \exp(-ikx))/R$$

$$V(x)=A1\ \exp(ikx)+A2\ \exp(-ikx)$$

When the cable is terminated with a passive impedance Z, their is a fixed ratio G(x) between the two wave vectors A1, A2 at any position x along the cable. This ratio G is called the reflection coefficient, as it represents the extent to which the wave vector Al of the wave travelling in one direction results in a wave vector A2 of a wave travelling in the opposite direction. When the cable is terminated with an impedance Z, the relation between the wave vectors at the point of termination "p" (x=p) is $$A2=G(p)*A1$$

where the reflection coefficient G(p) is given by:

$$G(p)=(Z-R)/(Z+R)$$

Hence if the cable is open ended at the point of termination (Z infinite) G=1, if the cable is short circuited (Z=0) G=−1 and if the cable is terminated by the characteristic impedance R of the cable (Z=R) G=0. The reflection coefficients G(x1), G(x2) at different positions x1, x2 along the cable differ from each other by a phase factor exp(−2ik(x1−x2)), which represents the phase shift due travel of the wave with wave vector Al from x1 to x2 and the phase shift of the wave with wave vector A2 back from x2 to x1. As a result, since the amplitude of exp(−2ik(x1−x2) equals 1, the amplitude of the reflection coefficient G(x), remains constant along the cable.

Wave splitter 24 sends data and/or commands to the slave station 14a. These data and or commands control one of the wave vectors A1, A2 as a function of time. The other one of the wave vectors A1, A2 is a result of reflection by whatever is present at the connector 12a or the end of the cable 16a connected to the connector 12a, be it a slave station 14a or an open end. This other one of the wave vectors A1, A2 is equal to a reflection coefficient G times the wave vector that is determined by the data and or commands.

Wave splitter 24 splits off this other one of the waves, that is, it determines its wave vector and it applies this wave vector to connector control circuit 22. Connector control circuit 22 uses this reflected wave vector to decide whether a slave station 14a is connected to the connector 12a via the cable 16a.

The slave station 14a, if present, applies substantially the characteristic impedance R of the cable 16a to the end of the cable 16a, so that the reflection coefficient G substantially equals zero if the slave station is connected to the cable 16a. If no slave station 14a is connected to the connector 12a via the cable 16a, the amplitude of the reflection coefficient is substantially 1. Hence, connector control circuit 22 decides that a slave station 14a is present if the ratio between amplitudes of the wave vectors A1, A2 of the reflected wave and the transmitted wave is equal to or below a threshold value between 1 and 0. Connector control circuit 22 decides that no slave station 14a is present if the ratio is above the threshold. Under ideal conditions, the threshold value might be taken anywhere in the interval from 0 to 1, but preferably the threshold value is not in an interval close to 0 that corresponds to non-zero reflection coefficients due to spread of the impedance of the slave station 14a within a tolerance range, nor in an interval close to 1 that corresponds to possible losses in the cable 16a etc. Of course, when the wave splitter applies an outgoing wave with a fixed average amplitude to the cable 16a, it is not necessary to determine the ratio between the wave vectors explicitly and the amplitude of the reflected wave may be compared with a threshold value.

The conventional method of detecting stations in the USB system may be used in addition to the present method. This is advantageous, because the conventional method provides for detection of more different states of connection, albeit at the expense of a slower response time.

FIG. 3 gives an example of a possible circuit implementation of wave splitter 24 for a cable 16a with symmetrical signal conductors. It will be clear that this circuit is but one example of many circuits for splitting off reflected waves known, per se, in the art. The circuit of FIG. 3 drives voltage and current on the connector 12a with a circuit that can be represented by an equivalent circuit that corresponds to a voltage source with output voltage "e" in series with an output impedance equal to the prescribed characteristic impedance of the cable 16a. As a result, the output voltage "e", the voltage V at the output of the wave splitter that is connected to the connector 12a and the current at that output are related by $$V=e-IR$$

As a result, the reflected wave vector is determined by $$A2=V-e/2$$

In the circuit shown in FIG. 3 contains a primary driver 30a,b that drives the voltage at the output that is connected to the connector 12a. This primary driver 30a,b is driven by the data and/or commands that are to be sent to the slave station 14a (not shown). The circuit contains a secondary driver 32a,b that forms e/2, by loading its output twice as heavily as the primary driver 30a,b (in proportion to the relative drive powers of the primary and secondary driver 30a,b, 32a,b; this is realized for example by using an NMOS driver transistor and a PMOS load in both primary and secondary drivers, where a ratio between the W/L of the NMOS driver transistor and the W/L of the PMOS load transistor in the secondary driver is half the corresponding ratio in the primary driver). The circuit contains a subtraction circuit 34 that subtracts the output voltage of the secondary driver 32a,b from the output voltage of the primary driver 30a,b. The output of the substraction circuit is proportional to the reflected wave vector A2 and is supplied to the connector control circuit 22 (not shown) for detection of a connected slave station.

What is claimed is:

1. A method of controlling a bus communication system, wherein the connection of a station to the bus system via a connector is detected by transmitting a transmitted wave signal via the connector and splitting of a return wave received at the connector, the bus system being operated in accordance with presence or absence of the further station dependent on non-detection and detection of a reflection of the transmitted wave signal respectively.

2. Integrated circuit device for use as a station in a communication bus system, the device comprising
   an external terminal (12a) for connecting the device to a signal transmission line;
   a control unit (22) arranged to operate in accordance with presence or absence in the communication bus system of an apparatus connected to the signal transmission line;
   a wave splitter (24) coupled to the external terminal;
   a transmission section coupled to an input of the wave splitter for transmitting an outgoing wave signal to travel out over the transmission line from the wave splitter;
   a reception section coupled to an output of the wave splitter for receiving an incoming wave signal that travels into the wave splitter from the connector, the control unit being arranged to operate in accordance with presence or absence of the apparatus dependent on whether the reception section does not detect or does detect a reflection of a wave transmitted by the transmission section respectively.

3. An apparatus for use as a station in a communication bus system, the apparatus comprising
   a connector (12a) for connecting the apparatus to a signal transmission line;
   a control unit (22) arranged to operate in accordance with presence or absence in the communication bus system of a further apparatus connected to the signal transmission line;
   a wave splitter (24) coupled to the connector;
   a transmission section coupled to an input of the wave splitter for transmitting an outgoing wave signal to travel out over the transmission line from the wave splitter;
   a reception section coupled to an output of the wave splitter for receiving an incoming wave signal that travels into the wave splitter from the connector, the control unit being arranged to operate in accordance with presence or absence of the further apparatus dependent on whether the reception section does not detect or does detect a reflection of a wave transmitted by the transmission section respectively.

4. A bus communication system comprising an apparatus according to claim 3, a signal transmission line connected to the connector, a further apparatus connected to the signal transmission line, the further apparatus comprising a terminating section connected to the signal transmission line, the terminating section providing an impedance to the signal transmission line that substantially matches a transmission line impedance of the transmission line when the further apparatus is operational to function as a station connected to the bus communication system.

* * * * *